US012753311B2

(12) United States Patent
Scheim et al.

(10) Patent No.: US 12,753,311 B2
(45) Date of Patent: Oct. 6, 2026

(54) CROSSLINKABLE COMPOSITIONS BASED ON ORGANOSILICON COMPOUNDS

(71) Applicant: Wacker Chemie AG, Munich (DE)

(72) Inventors: Uwe Scheim, Coswig (DE); Marko Prasse, Glaubitz (DE); Peter Schöley, Diera-Zehren OT Kleinzadel (DE)

(73) Assignee: Wacker Chemie AG, Munich (DE)

( * ) Notice: Subject to any disclaimer, the term of this patent is extended or adjusted under 35 U.S.C. 154(b) by 1223 days.

(21) Appl. No.: 17/631,901

(22) PCT Filed: Aug. 9, 2019

(86) PCT No.: PCT/EP2019/071462
§ 371 (c)(1),
(2) Date: Jul. 25, 2022

(87) PCT Pub. No.: WO2021/028007
PCT Pub. Date: Feb. 18, 2021

(65) Prior Publication Data

US 2022/0389168 A1 Dec. 8, 2022

(51) Int. Cl.

| | |
|---|---|
| ***C08L 83/08*** | (2006.01) |
| ***C08G 77/04*** | (2006.01) |
| ***C08G 77/18*** | (2006.01) |
| ***C08G 77/26*** | (2006.01) |
| ***C08L 83/04*** | (2006.01) |

(52) U.S. Cl.
CPC ............ *C08L 83/04* (2013.01); *C08G 77/045* (2013.01); *C08G 77/18* (2013.01); *C08G 77/26* (2013.01); *C08L 83/08* (2013.01)

(58) Field of Classification Search
CPC .............................. C08G 77/045; C08G 77/18
See application file for complete search history.

(56) References Cited

U.S. PATENT DOCUMENTS 2,821,518 A * 1/1958 Edelman ................ C08L 83/10
428/390

FOREIGN PATENT DOCUMENTS

| | | | | |
|---|---|---|---|---|
| CA | 2984738 A1 * | 5/2018 | | C07F 7/21 |
| CN | 104334644 A | 2/2015 | | |
| DE | 102004014216 A1 | 10/2005 | | |
| EP | 773262 A2 * | 5/1997 | | |
| EP | 1063344 A2 * | 12/2000 | | C08G 77/26 |
| EP | 1580224 A1 | 4/2008 | | |
| JP | 63006017 A * | 1/1988 | | |
| JP | 2004-130661 A * | 4/2004 | | |

OTHER PUBLICATIONS

Scifinder summary for an article entitled "Synthesis of Ethoxypolysiloxanes" authored by Andrianov and published in Zhurnal Obshchei Khimii (1965) 35(11), 2020-2021.*

"Rubber, vulcanized or thermoplastic—Determination of tensile stress-strain properties", ISO 37, Sixth edition Nov. 2017, Reference No. ISO 37:2017(E).

"Synthesis of ethoxypolyorganosiloxanes", Andrianov, K. A. et al., Zhurnal Obshchei Khimii, vol. 35, No. 11, pp. 2020-2021, 1964.

* cited by examiner

*Primary Examiner* — Marc S Zimmer
(74) *Attorney, Agent, or Firm* — Brooks Kushman P.C.

(57) ABSTRACT

A crosslinkable composition is based on organosilicon compounds that include (A) organopolysiloxanes of the formula (I), the formula (I) being $(R^7O)_{3-a}SiR^3_aO(SiR^4_2O)_nSiR^3_a(OR^7)_{3-a}$, and (B) siloxanes of the formula (II), the formular (II) being

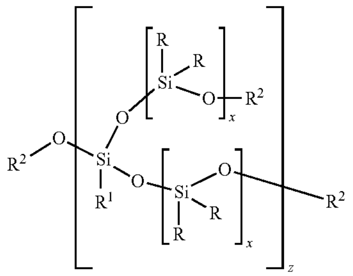

with the proviso that the sum of all x in formula (II) is greater than 0.

11 Claims, No Drawings

CROSSLINKABLE COMPOSITIONS BASED ON ORGANOSILICON COMPOUNDS

CROSSLINKABLE COMPOSITIONS BASED ON ORGANOSILICON COMPOUNDS

The invention relates to crosslinkable compositions based on organosilicon compounds, to a process for the production thereof and use thereof.

One-component sealant compositions which can be stored with exclusion of water and which harden at room temperature with elimination of alcohols to give elastomers upon exposure to water are already known. These products are used in large quantities, for example in the construction industry. These mixtures are based on polymers which are terminated by silyl groups bearing reactive substituents such as OH groups or hydrolyzable groups such as alkoxy groups. These sealants may also comprise fillers, plasticizers, crosslinkers, catalysts and various additives. In order to be usable as sealants, the cured moldings must have a low modulus. For example, DE-A1 102004014216 describes oligomeric siloxanes which have been produced from methyltrimethoxysilane or methyltriethoxysilane. It turned out, however, that the efficiency in terms of lowering the modulus of the mixtures produced therewith is low.

The invention relates to crosslinkable compositions based on organosilicon compounds comprising (A) organopolysiloxanes of the formula $$(R^7O)_{3-a}SiR^3{}_aO(SiR^4{}_2O)_nSiR^3{}_a(OR^7)_{3-a}, \quad (I)$$

where $R^4$ may be the same or different and are monovalent, optionally substituted hydrocarbon radicals, $R^7$ may be the same or different and are monovalent, optionally substituted hydrocarbon radicals, $R^3$ may be the same or different and are monovalent, optionally substituted hydrocarbon radicals, a may be the same or different and is 0 or 1, preferably 1, and n is an integer from 30 to 2000, and (B) siloxanes of the formula (II)

(II)

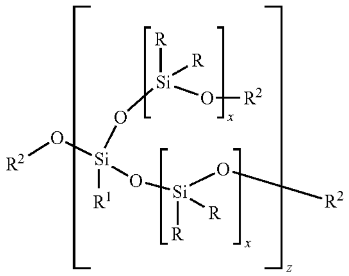

where

R may be the same or different and are monovalent, optionally substituted hydrocarbon radicals, $R^1$ may be the same or different and are monovalent hydrocarbon radicals having 2 to 16 carbon atoms, $—CH_2—NR^6R^5$ radicals or $—CH_2NR^{11}$ radicals where $R^5$ are hydrocarbon radicals having 1 to 12 carbon atoms, $R^6$ is a hydrogen atom or radical $R^5$, and $R^{11}$ is a divalent hydrocarbon radical which may be interrupted by heteroatoms, $R^2$ may be the same or different and are monovalent, optionally substituted hydrocarbon radicals, x may be the same or different and is 0 or an integer from 1 to 9 and z is 1 or 2, with the proviso that the sum of all x in formula (II) is greater than 0.

Examples of radicals R and $R^4$ are each independently alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radical; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl and cycloheptyl radical and methylcyclohexyl radicals; alkenyl radicals such as the vinyl, 1-propenyl and 2-propenyl radical; aryl radicals such as the phenyl, naphthyl, anthryl and phenanthryl radical; alkaryl radicals such as o-, m-, p-tolyl radicals; xylyl radicals and ethylphenyl radicals; and aralkyl radicals such as the benzyl radical or the α- and β-phenylethyl radicals.

The radicals R and $R^4$ are each independently preferably monovalent hydrocarbon radicals having 1 to 18 carbon atoms, particularly preferably methyl, vinyl or phenyl radicals, especially the methyl radical.

Examples of radicals $R^1$ are the hydrocarbon radicals having 2 to 16 carbon atoms specified for R, $—CH_2—NHCH_3$, $—CH_2NHCH_2CH_3$, $—CH_2NH(CH_2)_2CH_3$, $—CH_2NH(CH_2)_3CH_3$, $—CH_2NH\text{-cyclo}C_6H_{11}$, $—CH_2—N(CH_3)_2$, $—CH_2N(CH_2CH_3)_2$, $—CH_2N((CH_2)_2CH_3)_2$, $—CH_2N((CH_2)_3CH_3)_2$, $—CH_2—N[CH_2—CH_2]_2O$, $—CH_2—N[CH_2—CH_2]_2NH$ and $—CH_2—N[CH_2—CH_2]_2CH_2$.

The radical $R^1$ are preferably aliphatic hydrocarbon radicals having 2 to 16 hydrocarbon atoms that may be straight-chain, branched or cyclic, particularly preferably straight-chain, branched or cyclic, aliphatic saturated hydrocarbon radicals having 2 to 8 hydrocarbon atoms, especially the 2,2,4-trimethylpentyl radical.

Examples of radicals $R^2$ and $R^7$ are each independently the monovalent radicals specified for R.

The radicals $R^2$ and $R^7$ are each independently preferably alkyl radicals having 1 to 12 carbon atoms, particularly preferably methyl, ethyl, n-propyl or isopropyl radicals, especially the methyl or ethyl radical.

Examples of radicals $R^3$ are the monovalent hydrocarbon radicals specified for R and hydrocarbon radicals substituted by amino groups.

The radical $R^3$ are preferably monovalent hydrocarbon radicals having 1 to 12 carbon atoms, optionally substituted by amino groups, particularly preferably a methyl radical, ethyl radical, vinyl radical, phenyl radical, $—CH_2—NR^{6'}R^{5'}$ radical or the $—CH_2NR^{11'}$ radical, where $R^{5'}$ are hydrocarbon radicals having 1 to 12 carbon atoms, $R^{6'}$ is a hydrogen atom or radical $R^{5'}$, and $R^{11'}$ are divalent hydrocarbon radicals which may be interrupted by heteroatoms.

The radical $R^3$ is particularly preferably a $—CH_2—NR^{6'}R^{5'}$ radical or a $—CH_2NR^{11'}$ radical where $R^{5'}$, $R^{6'}$ and $R^{11'}$ have the definitions specified above, especially —$CH_2$—$N[(CH_2)_2]_2O$, —$CH_2$—$N(Bu)_2$ or —$CH_2$—NH(cHex), where Bu is an n-butyl radical and cHex is a cyclohexyl radical.

Examples of radicals $R^5$ and $R^{5'}$ are each independently the hydrocarbon radicals specified for R.

The radicals $R^5$ and $R^{5'}$ are each independently preferably the methyl, ethyl, isopropyl, n-propyl, n-butyl, cyclohexyl or phenyl radical, particularly preferably the n-butyl radical.

Examples of hydrocarbon radicals $R^6$ and $R^{6'}$ are each independently the hydrocarbon radicals specified for R.

The radicals $R^6$ and $R^{6'}$ are each independently preferably a hydrogen atom, the methyl, ethyl, isopropyl, n-propyl, n-butyl or cyclohexyl radical, particularly preferably the n-butyl radical.

Examples of divalent radicals $R^{11}$ and $R^{11'}$ are each independently alkylene radicals, such as the propane-1,3-diyl, butane-1,4-diyl, butane-1,3-diyl, 2-methylpropane-1,3-diyl, pentane-1,5-diyl, pentane-1,4-diyl, 2-methylbutane-1,4-diyl, 2,2-dimethylpropane-1,3-diyl, hexane-1,6-diyl, heptane-1,7-diyl, octane-1,8-diyl and 2-methylheptane-1,7-diyl and 2,2,4-trimethylpentane-1,5-diyl radical; alkenylene radicals, such as the propene-1,3-diyl radical, and the radicals —$CH_2$—$CH_2$—O—$CH_2$—$CH_2$— and —$CH_2$—$CH_2$—NH—$CH_2$—$CH_2$—.

The radicals $R^{11}$ and $R^{11'}$ are each independently preferably divalent hydrocarbon radicals having 4 to 6 carbon atoms, which may be interrupted by heteroatoms, preferably oxygen —O— or nitrogen —NH—, particularly preferably —$CH_2$—$CH_2$—O—$CH_2$—$CH_2$—.

The organopolysiloxanes (A) used according to the invention are preferably $(MeO)_2Si(Ox)O(SiMe_2O)_{30-2000}Si(Ox)(OMe)_2$,
$(MeO)_2Si(DBA)O(SiMe_2O)_{30-2000}Si(DBA)(OMe)_2$,
$(MeO)_2Si(cHx)O(SiMe_2O)_{30-2000}Si(cHx)(OMe)_2$,
$(MeO)_2Si(R^3)O(SiMe_2O)_{700}Si(R^3)(OMe)_2$,
$(EtO)_2Si(Ox)O(SiMe_2O)_{30-2000}Si(Ox)(OEt)_2$,
$(EtO)_2Si(DBA)O(SiMe_2O)_{30-2000}Si(DBA)(OEt)_2$,
$(EtO)_2Si(cHx)O(SiMe_2O)_{30-2000}Si(cHx)(OEt)_2$ or
$(EtO)_2Si(R^3)O(SiMe_2O)_{700}Si(R^3)(OEt)_2$, particularly preferably $(EtO)_2Si(Ox)O(SiMe_2O)_{30-2000}Si(Ox)(OEt)_2$,
$(EtO)_2Si(DBA)O(SiMe_2O)_{30-2000}Si(DBA)(OEt)_2$ or
$(EtO)_2Si(cHx)O(SiMe_2O)_{30-2000}Si(cHx)(OEt)_2$, especially $(EtO)_2Si(Ox)O(SiMe_2O)_{30-2000}Si(Ox)(OEt)_2$, where Me is a methyl radical, Et is an ethyl radical, Ox is —$CH_2$—$N[(CH_2)_2]_2O$, DBA is —$CH_2$—$N(nBu)_2$, cHx is —$CH_2$—NH(cHex), Bu is an n-butyl radical and cHex is a cyclohexyl radical, and $R^3$ is Me, Et, a vinyl radical, a phenyl radical, DBA, Ox or cHx, where the radicals $R^3$ have an identical definition within the individual compounds.

The organopolysiloxanes (A) used according to the invention have a viscosity of preferably 6000 to 350000 mPas, particularly preferably 20000 to 120000 mPas, in each case at 25° C.

The organopolysiloxanes (A) are commercially available products or they may be produced by common methods in silicon chemistry.

The siloxanes (B) used according to the invention are preferably those of the formula (II), where R is Me, $R^2$ is Me or Et, the sum of x is 1-9 and z is 1 or 2 and $R^1$ may be the same or different and are monovalent hydrocarbon radicals having 2 to 16 carbon atoms, particularly preferably those of the formula (II), where R is Me, $R^2$ is Me, the sum of x is 1-9 and z is 1 or 2, and $R^1$ are monovalent hydrocarbon radicals having 2 to 16 carbon atoms, especially those of the formula (II), where R is Me, $R^2$ is Me, the sum of x is 1-9 and z is 1 or 2, and $R^1$ is the 2,2,4-trimethylpentyl radical where Me is the methyl radical and Et is the ethyl radical.

Examples of compounds of the formula (II) are $EtO(SiMe_2O)_3SiR^1(OEt)_2$,
$(EtO(SiMe_2O)_3)_2SiR^1(OEt)_2$,
$MeO(SiMe_2O)_3SiR^1(OMe)_2$,
$(MeO(SiMe_2O)_3)_2SiR^1OMe)$,
$EtO(SiMe_2O)_3SiR^1(OEt)O(SiMe_2O)_3SiR^1(OEt)_2$,
$MeO(SiMe_2O)_3SiR^1(OMe)O(SiMe_2O)_3SiR^1(OMe)_2$,
$EtO(SiMe_2O)_xSi(iOct)(OEt)_2$,
$(EtO(SiMe_2O)_x)_2Si(iOct)(OEt)$,
$MeO(SiMe_2O)_xSi(iOct)(OMe)_2$,
$(MeO(SiMe_2O)_x)_2Si(iOct)(OMe)$,
$EtO(SiMe_2O)_xSi(iOct)(OEt)O(SiMe_2O)_3Si(iOct)(OEt)_2$ or
$MeO(SiMe_2O)_xSi(iOct)(OMe)O(SiMe_2O)_3Si(iOct)(OMe)_2$ where Me is the methyl radical, Et is the ethyl radical and iOct is the 2,2,4-trimethylpentyl radical, x=1-9, and $R^1$ are straight-chain, branched or cyclic, aliphatic hydrocarbon radicals having 2 to 8 hydrocarbon atoms, where the radicals $R^1$ have an identical definition within the individual compounds.

In particular, the siloxanes (B) used according to the invention are $MeO(SiMe_2O)_xSi(iOct)(OMe)_2$,
$(MeO(SiMe_2O)_x)_2Si(iOct)(OMe)$ or
$MeO(SiMe_2O)_xSi(iOct)(OMe)O(SiMe_2O)_3Si(iOct)(OMe)_2$ where Me is the methyl radical and iOct is the 2,2,4-trimethylpentyl radical and x=1-9.

The siloxanes (B) used according to the invention have a viscosity of preferably 5 to 15 mPas at 25° C.

The siloxanes (B) preferably have the average composition $[R^1(OMe)_2O_{1/2}]_a[R^1Si(OMe)O_{2/2}]_b[R^1SiO_{3/2}]_c[Me_2SiO_{2/2}]_d[Me_2Si(OMe)O_{1/2}]_e$, where a=0.05-0.15, b=0.10-0.20, c=0.00-0.10, d=0.40-0.65 and e=0.10-0.30 where $a+b+c<d+e$ and $a+b+c+d+e=1$ where Me is the methyl radical and $R^1$ has the definition specified above.

The siloxanes (B) can be produced by methods common in silicon chemistry, such as, for example, by equilibrating polydimethylsiloxanes with trialkoxysilanes under basic catalysis.

The compositions according to the invention comprise component (B) in amounts of preferably 1 to 20 parts by weight, particularly preferably 1 to 10 parts by weight, especially 2 to 6 parts by weight, based in each case on 100 parts by weight component (A).

The invention further relates to siloxanes of the formula (II), where R may be the same or different and are monovalent, optionally substituted hydrocarbon radicals, $R^1$ are —$CH_2$—$NR^6R^5$ radicals or —$CH_2NR^{11}$ radicals where $R^5$ are hydrocarbon radicals having 1 to 12 carbon atoms, $R^6$ is a hydrogen atom or radical $R^5$, and $R^{11}$ is a divalent hydrocarbon radical which may be interrupted by heteroatoms, $R^2$ may be the same or different and are monovalent, optionally substituted hydrocarbon radicals, x may be the same or different and is 0 or an integer from 1 to 9 and z is 1 or 2, with the proviso that the sum of all x in formula (II) is greater than 0.

In addition to the siloxanes (A) and (B), the compositions according to the invention may comprise a component (C) consisting of silanes of the formula $$(R^8O)_{4-b}SiR^9_b \quad (III)$$

and/or partial hydrolyzates thereof, where b is 0, 1 or 2, preferably 0 or 1, $R^8$ may be the same or different and are monovalent, optionally substituted hydrocarbon radicals and $R^9$ are monovalent, optionally substituted hydrocarbon radicals.

The radical $R^8$ are preferably alkyl radicals having 1 to 12 carbon atoms, particularly preferably methyl, ethyl, n-propyl or isopropyl radicals, especially the methyl or the ethyl radical.

The radical $R^9$ are preferably monovalent hydrocarbon radicals having 1 to 18 carbon atoms, optionally substituted by glycidoxy, ureido, methacryloxy or amino groups, particularly preferably alkyl radicals, the vinyl or the phenyl radical, especially the methyl radical or the 2,2,4-trimethylpentyl radical.

In a preferred embodiment, the component (C) used are in whole or in part silanes, and/or partial hydrolyzates thereof, having functional groups, such as those having glycidoxypropyl, aminopropyl, aminoethylaminopropyl, ureidopropyl or methacryloxypropyl radicals, especially when adhesion-promoting properties are desired.

The partial hydrolyzates (C) optionally used may be partial homohydrolyzates, i.e. partial hydrolyzates of one type of silanes of the formula (III), and partial co-hydrolyzates, i.e. partial hydrolyzates of at least two different types of silanes of the formula (III).

In the context of the invention, the term partial hydrolyzates is understood to mean products which are formed by hydrolysis and/or condensation.

If component (C) used in the compositions according to the invention are partial hydrolyzates of silanes of the formula (III), preference is given to those having up to 20 silicon atoms.

Examples of component (C) optionally used according to the invention are methyltrimethoxysilane, vinyltrimethoxysilane, phenyltrimethoxysilane, 2,2,4-trimethylpentyltrimethoxysilane, methyltriethoxysilane, vinyltriethoxysilane, phenyltriethoxysilane, tetraethoxysilane, 2,2,4-trimethylpentyltriethoxysilane, (2,3,5,6-tetrahydro-1,4-oxazin-4-yl)methyltriethoxysilane, N,N-di-n-butylaminomethyltriethoxysilane, N-cyclohexylaminomethyltriethoxysilane, (2,3,5,6-tetrahydro-1,4-oxazin-4-yl)methyltrimethoxysilane, N,N-di-n-butylaminomethyltrimethoxysilane, N-cyclohexylaminomethyltrimethoxysilane, wherein preference is given to methyltrimethoxysilane, vinyltriethoxysilane, tetraethoxysilane, 2,2,4-trimethylpentyltrimethoxysilane, (2,3,5,6-tetrahydro-1,4-oxazin-4-yl)methyltriethoxysilane.

Component (C) are commercially available products or can be produced by methods common in silicon chemistry.

If the compositions according to the invention comprise component (C), the amounts involved are preferably 0.01 to 5 parts by weight, particularly preferably 0.01 to 2 parts by weight, especially 0.05 to 2 parts by weight, based in each case on 100 parts by weight component (A). The compositions according to the invention preferably comprise component (C), these preferably comprising at least in part silanes and/or partial hydrolyzates thereof having functional groups.

In addition to components (A), (B) and optionally (C), the compositions according to the invention may comprise all substances which have also hitherto been used in compositions crosslinkable by a condensation reaction, such as curing accelerators (D), plasticizers (E), fillers (F) and additives (G).

The curing accelerators (D) used may be all curing accelerators which have also hitherto been used in compositions crosslinkable by a condensation reaction. Examples of curing accelerators (D) are titanium compounds, such as tetrabutyl or tetraisopropyl titanate, or titanium chelates such as bis(ethylacetoacetato) diisobutoxytitanium, or organic tin compounds such as di-n-butyltin dilaurate and di-n-butyltin diacetate, di-n-butyltin oxide, dimethyltin diacetate, di-methyltin dilaurate, dimethyltin dineodecanoate, dimethyltin oxide, di-n-octyltin diacetate, di-n-octyltin dilaurate, di-n-octyltin oxide and reaction products of these compounds with alkoxysilanes, such as the reaction product of di-n-butyltin diacetate with tetraethoxysilane, wherein preference is given to di-n-octyltin diacetate, di-n-octyltin dilaurate, dioctyltin oxide, reaction products of di-n-octyltin oxide with tetraethoxysilane, tetrabutyl titanate, tetraisopropyl titanate or bis(ethylacetoacetato) diisobutoxytitanium.

If the compositions according to the invention comprise curing accelerators (D), the amounts involved are preferably 0.001 to 20 parts by weight, particularly preferably 0.001 to 1 part by weight, based in each case on 100 parts by weight constituent (A).

Examples of plasticizers (E) optionally used are dimethylpolysiloxanes which are liquid at room temperature and which are end-blocked by trimethylsiloxy groups, in particular having viscosities at 25° C. in the range between 5 and 1000 mPas, and high-boiling hydrocarbons such as paraffin oils or mineral oils consisting of naphthenic and paraffinic units.

If the compositions according to the invention comprise component (E), the amounts involved are preferably 5 to 30 parts by weight, more preferably 5 to 25 parts by weight, based in each case on 100 parts by weight of siloxanes (A). The compositions according to the invention preferably do not comprise any plasticizer (E).

The fillers (F) optionally used in the compositions according to the invention can be any previously known fillers.

Examples of optionally used fillers (F) are non-reinforcing fillers (F), i.e. fillers having a BET surface area of up to 20 $m^2/g$, such as quartz, diatomaceous earth, calcium silicate, zirconium silicate, zeolites, metal oxide powders such as aluminum, titanium, iron or zinc oxides or mixed oxides thereof, barium sulfate, calcium carbonate, gypsum, silicon nitride, silicon carbide, boron nitride, glass and plastic powders such as polyacrylonitrile powder; reinforcing fillers, i.e. fillers having a BET surface area of more than 20 $m^2/g$, such as precipitated chalk and carbon black, such as furnace and acetylene black; silicas such as fumed silica and precipitated silica; fibrous fillers such as plastic fibers.

The fillers (F) optionally used are preferably calcium carbonate or silica, particularly preferably silica or a mixture of silica and calcium carbonate.

Preferred types of calcium carbonate (F) are ground or precipitated and optionally surface-treated with fatty acids such as stearic acid or salts thereof. The preferred silica is preferably fumed silica.

If the compositions according to the invention comprise fillers (F), the amounts involved are preferably 10 to 150 parts by weight, particularly preferably 10 to 130 parts by weight, especially 10 to 100 parts by weight, based in each case on 100 parts by weight organopolysiloxanes (A). The compositions according to the invention preferably comprise filler (F).

Examples of additives (G) are pigments, dyes, fragrances, oxidation inhibitors, agents for influencing the electrical properties, such as conductive carbon black, agents which make them flame-resistant, light stabilizers, biocides such as fungicides, bactericides and acaricides, cell-generating agents, for example azodicarbonamide, heat stabilizers, scavengers such as Si—N containing silazanes or silylamides, for example N,N'-bistrimethylsilylurea or hexamethyldisilazane, co-catalysts, such as Lewis and Brönsted acids, e.g. sulfonic acids, phosphoric acids, phosphoric acid esters, phosphonic acids and phosphonic acid esters, thixotropic agents such as polyethylene glycol OH-terminated on one or both sides or hardened castor oil, agents for further regulating the modulus such as polydimethylsiloxanes having an OH end group, and any siloxanes that differ from components (A), (B) and (C).

If the compositions according to the invention comprise additives (G), the amounts involved are preferably 0.1 to 20 parts by weight, particularly preferably 0.1 to 15 parts by weight, especially 0.1 to 10 parts by weight, based in each case on 100 parts by weight organopolysiloxanes (A). The compositions according to the invention preferably comprise component (G).

The individual constituents of the compositions according to the invention can each be one type of such a constituent as well as a mixture of at least two different types of such constituents.

The compositions according to the invention are preferably those which comprise (A) organopolysiloxanes of the formula (I),
(B) siloxanes of the formula (II),
optionally (C) silanes of the formula (III) and/or partial hydrolyzates thereof,
optionally (D) curing accelerators,
optionally (E) plasticizers,
optionally (F) fillers and
optionally (G) additives.

The compositions according to the invention are particularly preferably those which comprise (A) organopolysiloxanes of the formula (I),
(B) siloxanes of the formula (II),
(C) silanes of the formula (III) and/or partial hydrolyzates thereof,
optionally (D) curing accelerators,
optionally (E) plasticizers,
optionally (F) fillers and
optionally (G) additives.

In particular, the compositions according to the invention are those which comprise (A) organopolysiloxanes of the formula (I),
(B) siloxanes of the formula (II),
(C) silanes of the formula (III) and/or partial hydrolyzates thereof,
(D) curing accelerators,
optionally (E) plasticizers,
(F) fillers and
optionally (G) additives.

In a further preferred embodiment, the compositions according to the invention are those which comprise (A) organopolysiloxanes of the formula (I),
(B) siloxanes of the formula (II),
(C) silanes of the formula (III) and/or partial hydrolyzates thereof,
(D) curing accelerators,
(F) fillers and
optionally (G) additives
and are free from (E) plasticizers.

Apart from components (A) to (G), the compositions according to the invention preferably comprise no other constituents.

The compositions according to the invention are preferably viscous to pasty compositions.

To produce the compositions according to the invention, all constituents can be mixed with one another in any sequence. This mixing can take place at room temperature and the pressure of the surrounding atmosphere, i.e. about 900 to 1100 hPa. If desired, however, this mixing can also take place at higher temperatures, for example at temperatures in the range of 35 to 135□C. It is also possible to mix intermittently or continuously under reduced pressure, for example at 30 to 500 hPa absolute pressure, in order to remove volatile compounds or air.

The mixing according to the invention preferably takes place with the greatest possible exclusion of water, i.e. the use of raw materials having a water content of preferably less than 10000 mg/kg, preferably less than 5000 mg/kg, especially less than 1000 mg/kg. During the mixing process, the mixture is preferably blanketed with dry air or protective gas such as nitrogen, the relevant gas having a moisture content of preferably less than 10000 μg/kg, preferably less than 1000 μg/kg, especially less than 500 μg/kg. After production, the pastes are filled into commercially available moisture-proof containers such as cartridges, tubular bags, bins and drums.

In a preferred procedure, components (A), (B), optionally (C) and (E) are first mixed with one another, then optionally fillers (F) are added and finally optional further constituents (D) and (G) are added, the mixing temperature not exceeding 60° C.

The invention also provides a process for producing the compositions according to the invention by mixing the individual constituents.

The process according to the invention can be carried out continuously, batchwise or semi-continuously according to known processes and using known apparatus.

The compositions according to the invention or produced according to the invention can be stored with exclusion of moisture and can be crosslinked on ingress of moisture.

The usual water content of air is sufficient for crosslinking the compositions according to the invention. The compositions according to the invention are preferably crosslinked at room temperature. If desired, it can also be carried out at temperatures higher or lower than room temperature, for example at −5° to 15° C. or at 30° C. to 50° C. and/or by means of concentrations of water exceeding the normal water content of air.

The crosslinking is preferably carried out at a pressure of 100 to 1100 hPa, especially at the pressure of the surrounding atmosphere, i.e. about 900 to 1100 hPa.

The present invention further relates to moldings produced by crosslinking the compositions according to the invention.

The moldings according to the invention have a stress at 100% elongation of preferably less than 0.4 MPa, measured on type 2 test specimens in accordance with ISO 37.

The compositions according to the invention can be used for all purposes for which compositions which can be stored with the exclusion of water and which crosslink to form elastomers on ingress of water at room temperature can be used.

The compositions according to the invention are therefore excellently suited, for example, as sealing compositions for joints, including vertical joints, and similar cavities of, for example, 10 to 40 mm clear width, for example of buildings, land vehicles, watercraft and aircraft, or as adhesives or cementing compositions, for example in window construction or in the production of display cases, and also for example for producing protective coatings, including surfaces exposed to the constant action of fresh or sea water or coatings that prevent sliding or of elastomeric moldings.

The compositions according to the invention have the advantage that they are easy to manufacture and are distinguished by a very high storage stability.

Furthermore, the compositions according to the invention have the advantage that they are very easy to handle when in use and have excellent processing properties in a wide range of applications.

The crosslinkable compositions according to the invention have the advantage that the modulus can be specifically adjusted.

The crosslinkable compositions according to the invention have the advantage that they adhere very well to a wide range of substrates.

The crosslinkable compositions according to the invention have the advantage that they do not cause any edge zone contamination of the adjacent substrates. In particular, they are ideally suited to grouting natural and artificial stones without contaminating the edge zones.

The crosslinkable compositions according to the invention have the advantage that they are very economical with respect to the substances used.

In the examples described below, all viscosity data relate to a temperature of 25° C. Unless otherwise stated, the following examples are carried out at a pressure of the surrounding atmosphere, i.e. about 1000 hPa, and at room temperature, i.e. at about 23° C., or at a temperature that arises when the reactants are combined at room temperature without additional heating or cooling, and at a relative humidity of about 50%. Furthermore, all specifications of parts and percentages are by weight, unless otherwise stated.

The tensile strength, elongation at break and the stress at 100% elongation are determined in accordance with ISO 37 on type 2 test specimens.

In the context of the present invention, the dynamic viscosity is measured in accordance with DIN 53019, unless otherwise stated, at 25° C. by means of a "Physica MCR 300" rotational rheometer from Anton Paar. A cone-plate measuring system (Searle system with measuring cone CP 50-1) is used for values greater than 200 mPa·s. The shear rate is adjusted to the polymer viscosity: 5000 to 9999 mPa·s at 62 1/s; 10000 to 12499 mPa·s at 50 1/s; 12500 to 15999 mPa·s at 38.5 1/s; 16000 to 19999 mPa·s at 33 1/s; 20000 to 24999 mPa·s at 25 1/s; 25000 to 29999 mPa·s at 20 1/s; 30000 to 39999 mPa·s at 17 1/s; 40000 to 59999 mPa·s at 10 1/s; 60000 to 149999 at 5 1/s.

After setting the temperature of the measuring system to the measurement temperature, a three-stage measurement program consisting of a run-in phase, pre-shear and viscosity measurement is applied. The run-in phase takes place by stepwise increase of the shear rate over one minute to the aforementioned shear rate, dependent on the viscosity to be expected, at which the measurement is intended to be carried out. Once this has been reached, the pre-shear is carried out at constant shear rate for 30 s, then 25 individual measurements are carried out, each for 4.8 seconds, for determination of the viscosity, from which the mean value is determined. The mean value corresponds to the dynamic viscosity which is reported in mPa·s.

In the examples B1-B3 below, the molecular compositions were determined by means of nuclear magnetic resonance spectroscopy (for terminology see ASTM E 386: High-resolution nuclear magnetic resonance (NMR) spectroscopy: Terms and Symbols), wherein the 29Si nucleus was measured.

Abbreviations used below are:

Me for methyl radical,

Et for ethyl radical,

Bu for n-butyl radical and iOct for 2,2,4-trimethylpentyl radical.

Production of an Oligomeric Mixture B1

240 g (3.25 mol) of an α□ω-bis (trimethylsiloxy) polydimethylsiloxane having a viscosity of 1000 mPas, 234 g (1.0 mol) of trimethoxy (2,4,4-trimethylpentyl)silane (=iOctSi$(OMe)_3$), available from Wacker Chemie AG under the name SILRES® BS 1316 and 0.80 g of a solution of sodium ethoxide (21%) in ethanol are mixed and heated to 110° C. for 4 hours. After the solution has cooled, the mixture is neutralized by adding 1.60 g of a solution of dimethyldichlorosilane (10%) in n-heptane. This mixture was evaporated at a reduced pressure of 50 mbar at 120° C. on a rotary evaporator.

The composition of the mixture was determined by means of 29-Si-NMR spectroscopy. The mixture comprised 1.4% by weight iOctSi$(OMe)_3$, 0.4% by weight $Me_2Si(OMe)_2$ and 98.2% by weight of an oligomeric mixture of average composition $[iOctSi(OMe)_2O_{1/2}]_{0.08}[iOctSi(OMe)O_{2/2}]_{0.15}[iOctSiO_{3/2}]_{0.05}[Me_2SiO_{2/2}]_{0.43}[Me_2Si(OMe)O_{1/2}]_{0.29}$.

The molecular weights determined by gel permeation chromatography were 929 g/mol (Mw—weight average) and 635 (Mn—number average). The polydispersity (Mw/Mn) was 1.46.

Production of an Oligomeric Mixture B2

The procedure for preparing the oligomeric mixture B1 was repeated with the modification that 178 g of n-butyltrimethoxysilane were used instead of trimethoxy (2,4,4-trimethylpentyl)silane. The mixture comprised 0.7% by weight n-BuSi$(OMe)_3$, 0.2% by weight $Me_2Si(OMe)_2$ and 99.1% by weight of an oligomeric mixture of average composition $[n\text{-}BuSi(OMe)_2O_{1/2}]_{0.08}[n\text{-}BuSi(OMe)O_{2/2}]_{0.15}[n\text{-}BuSiO_{3/2}]_{0.07}[Me_2Si_{2/2}]_{0.46}[Me_2Si(OMe)O_{1/2}]_{0.24}$.

Production of an oligomeric mixture B3

The procedure for preparing the oligomeric mixture B1 was repeated with the modification that 346 g of n-hexadecyltrimethoxysilane were used instead of trimethoxy (2,4,4-trimethylpentyl)silane. The mixture comprised 3.6% by weight n-$C_{16}H_{33}Si(OMe)_3$, 0.5% by weight $Me_2Si(OMe)_2$ and 95.9% by weight of an oligomeric mixture of average composition $[n\text{-}C_{16}H_{33}Si(OMe)_2O_{1/2}]_{0.14}[n\text{-}C_{16}H_{33}Si(OMe)O_{2/2}]_{0.13}[n\text{-}C_{16}H_{33}SiO_{3/2}]_{0.02}[Me_2SiO_{2/2}]_{0.61}[Me_2Si(OMe)O_{1/2}]_{0.10}$.

Production of a Siloxane A1

A mixture of 330 kg of an α□ωdihydroxypolydimethylsiloxane having a viscosity of 80000 mPas and 110 kg of an a α□ωdihydroxypolydimethylsiloxane having a viscosity of 20000 mPas were stirred with 15.22 kg of a solution of 0.02 kg of 1,5,7-triazabicyclo [4.4.0]dec-5-ene in 15.2 kg of (2,3,5,6-tetrahydro-1,4-oxazin-4-yl)methyltriethoxysilane at 200 $min^{-1}$ for 5 minutes. After a reaction time of 5 minutes, this gave a mixture of 98.0% by weight α□ω-bis (2,3,5,6-tetrahydro-1,4-oxazin-4-yl) methyldiethoxysilylpolydimethylsiloxane, 1.9% by weight (2,3,5,6-tetrahydro-1,4-oxazin-4-yl) methyltriethoxysilane and 0.1% by weight ethanol, having a viscosity of 52000 mPas.

Production of an RTV1 Base Mix BM1

455 kg of the siloxane A1 were added to 10.6 kg of tetraethoxysilane hydrolyzate oligomer having an $SiO_2$ content of 40% on total hydrolysis and condensation, available from Wacker Chemie AG under the name SILIKAT TES 40, 12.6 kg of a mixture of 6.3 kg of methyltriethoxysilane hydrolyzate oligomers having an average of 10 silicon atoms per molecule and 6.3 kg of 3-aminopropyltriethoxysilane and the mixture was stirred for a further 5 minutes at 200 revolutions per minute. Thereafter, 44 kg of a hydrophilic fumed silica were added having a surface area of 150 $m^2/g$, available from Wacker Chemie AG under the name HDK® V15A, and the mixture was initially stirred at 200 revolutions per minute for a further 5 minutes until all the fumed silica had been wetted. The mixture was then stirred for 10 min at 600 $min^{-1}$ at a reduced pressure of 200 mbar. Finally, 1.58 kg of a solution of 0.27 kg of dioctyltin oxide in 1.31 kg of a mixture of 0.655 kg of methyltriethoxysilane hydrolyzate oligomers having an average of 10 silicon atoms per molecule and 0.655 kg of 3-aminopropyltriethoxysilane and 2 kg of a 50% by weight solution of octylphosphonic acid in methyltrimethoxysilane were added and the mixture was stirred for a further 5 minutes under reduced pressure (200 mbar). This base mix BM1 serves as the basis for the production of the inventive examples below.

EXAMPLES 1-9

The amounts of the oligomeric mixture B1 specified in Table 1 were added in each case to 250 g of the RTV1 base mix BM1 and mixed in in a planetary mixer of the Labmax type. The mixture thus obtained in each case was then filled into moisture-proof containers. 24 hours after the production of the mixtures, 2 mm thick plates were taken out of these mixtures and, after 7 days of curing at 23° C. and 50% relative humidity, dumbbell-shaped test specimens of type 2, in accordance with ISO 37, 6th edition 2017-11, were produced therefrom. The mechanical properties that were measured on these test specimens can be found in Table 1.

COMPARATIVE EXAMPLE 1(C1)

250 g of the RTV1 base mixture BM1 without further additives were filled in moisture-proof containers. 24 hours after the production of the base mix, 2 mm thick plates were taken out and, after 7 days of curing at 23° C. and 50% relative humidity, dumbbell-shaped test specimens of type 2, in accordance with ISO 37, 6th edition 2017-11, were produced therefrom. The mechanical properties that were measured on these test specimens can be found in Table 1.

EXAMPLE 10

The experiment according to Example 1 was repeated with the modification that 5 g of the oligomeric mixture B2 were added instead of the oligomeric mixture B1. The mechanical properties that were measured on these test specimens can be found in Table 1.

EXAMPLE 11

The experiment according to Example 1 was repeated with the modification that 5 g of the oligomeric mixture B3 are added instead of the oligomeric mixture B1. The mechanical properties that were measured on these test specimens can be found in Table 1.

TABLE 1

| Example | Oligomeric mixture | | Tensile strength [MPa] | Elongation at break [%] | Stress at 100% elongation [MPa] |
|---|---|---|---|---|---|
| 1 | B1 | 5.0 g | 2.06 | 417 | 0.61 |
| 2 | B1 | 7.5 g | 1.80 | 420 | 0.55 |
| 3 | B1 | 10.0 g | 1.93 | 494 | 0.49 |
| 4 | B1 | 12.5 g | 1.57 | 496 | 0.42 |
| 5 | B1 | 15.0 g | 1.66 | 525 | 0.41 |
| 6 | B1 | 17.5 g | 1.48 | 548 | 0.37 |
| 7 | B1 | 20.0 g | 1.29 | 572 | 0.32 |
| 8 | B1 | 22.5 g | 1.02 | 601 | 0.27 |
| 9 | B1 | 25.0 g | 0.85 | 723 | 0.21 |
| C1 | | 0.0 | 1.90 | 355 | 0.68 |
| 10 | B2 | 5.0 g | 2.48 | 513 | 0.58 |
| 11 | B3 | 5.0 g | 2.28 | 451 | 0.62 |

The invention claimed is:

1. A crosslinkable composition based on organosilicon compounds comprising (A) organopolysiloxanes of the formula $$(R^7O)_{3-a}SiR^3_aO(SiR^4_2O)_nSiR^3_a(OR^7)_{3-a}, \quad (I)$$

where $R^4$ are the same or different and are monovalent, optionally substituted hydrocarbon radicals, $R^7$ are the same or different and are monovalent, optionally substituted hydrocarbon radicals, $R^3$ are the same or different and are monovalent, optionally substituted hydrocarbon radicals, a are the same or different and are 0 or 1 and n is an integer from 30 to 2000, and (B) siloxanes of the formula (II)

(II)

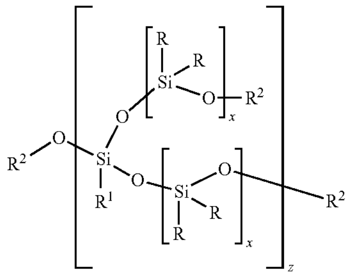

where

R are the same or different and are monovalent, optionally substituted hydrocarbon radicals, $R^1$ are the same or different and are monovalent hydrocarbon radicals having 2 to 16 carbon atoms, $-CH_2-$ $NR^6R^5$ radicals or $—CH_2NR^{11}$ radicals where $R^5$ are hydrocarbon radicals having 1 to 12 carbon atoms, $R^6$ is a hydrogen atom or radical $R^5$, and $R^{11}$ is a divalent hydrocarbon radical which is optionally interrupted by heteroatoms, $R^2$ are the same or different and are monovalent, optionally substituted hydrocarbon radicals, x are the same or different and is 0 or an integer from 1 to 9 and z is 1 or 2, with the proviso that the sum of all x in formula (II) is greater than 0.

2. The composition as claimed in claim 1, wherein at least one radical $R^1$ is an aliphatic hydrocarbon radical having 2 to 16 carbon atoms.

3. The composition as claimed in claim 1, wherein the radical $R^3$ is a $—CH_2—NR^{6'}R^{5'}$ radical or a $—CH_2NR^{11'}$ radical, where $R^{5'}$ are hydrocarbon radicals having 1 to 12 carbon atoms, Re is a hydrogen atom or radical $R^{5'}$, and $R^{11'}$ are divalent hydrocarbon radicals which are optionally interrupted by heteroatoms.

4. The composition as claimed in claim 1, wherein the composition comprises component (B) in amounts of 1 to 20 parts by weight, based on 100 parts by weight of component (A).

5. The composition as claimed in claim 1, wherein the composition further comprises component (C) consisting of silanes of the formula $$(R^8O)_{4-b}SiR^9_b \tag{III}$$

and/or partial hydrolyzates thereof, where b is 0, 1 or 2, $R^8$ are the same or different and are monovalent, optionally substituted hydrocarbon radicals and $R^9$ are monovalent, optionally substituted hydrocarbon radicals.

6. The composition as claimed in claim 5, wherein the composition comprises:

(C) silanes of the formula (III)

$$(R^8O)_{4-b}SiR^9_b \tag{III}$$

and/or partial hydrolyzates thereof, where b is 0, 1 or 2, $R^8$ are the same or different and are monovalent, optionally substituted hydrocarbon radicals and $R^9$ are monovalent, optionally substituted hydrocarbon radicals, optionally (D) curing accelerators, optionally (E) plasticizers, optionally (F) fillers and optionally (G) additives.

7. The composition as claimed in claim 6, wherein the composition comprises (D) curing accelerators, (F) fillers and optionally (G) additives and is free from (E) plasticizers.

8. A process for producing the composition as claimed in claim 1 by mixing the individual constituents.

9. A molding produced by crosslinking the composition of claim 1.

10. A molding produced by crosslinking a composition prepared by the process of claim 8.

11. The molding as claimed in claim 9, wherein said molding has a stress at 100% elongation of less than 0.4 MPa.

* * * * *